United States Patent [19]

Furda

[11] 4,106,077
[45] Aug. 8, 1978

[54] TOP MOUNTED PHOTOFLASH ATTACHMENT FOR CAMERAS WITH SELF-DEVELOPING FILM

[75] Inventor: Dymetro P. Furda, Irvington, N.J.

[73] Assignee: International Telephone and Telegraph Corporation, Nutley, N.J.

[21] Appl. No.: 835,566

[22] Filed: Sep. 22, 1977

Related U.S. Application Data

[63] Continuation of Ser. No. 664,772, Mar. 8, 1976, abandoned.

[51] Int. Cl.² .................. G03B 15/02; G03B 15/03
[52] U.S. Cl. .................................. 362/8; 354/126; 354/145; 362/3
[58] Field of Search ............... 240/1.3; 354/145, 126, 354/295; 362/3, 8, 9

[56] References Cited

U.S. PATENT DOCUMENTS

| | | | |
|---|---|---|---|
| 2,861,444 | 11/1958 | Bonanno | 240/1.3 X |
| 3,364,829 | 1/1968 | Ackerman | 240/1.3 X |
| 3,424,071 | 1/1969 | Schwahn | 354/145 X |
| 3,559,548 | 2/1971 | Ackerman | 354/145 X |
| 3,583,304 | 6/1971 | Brandt | 240/1.3 X |
| 3,852,790 | 12/1974 | Robinson | 354/145 |
| 3,967,302 | 6/1976 | Cote et al. | 354/295 |
| 3,967,303 | 6/1976 | Fischer et al. | 354/295 |
| 3,997,775 | 12/1976 | Stoneham | 354/145 X |

*Primary Examiner*—Fred L. Braun
*Attorney, Agent, or Firm*—John T. O'Halloran; Peter C. van der Sluys

[57] ABSTRACT

A single bodied unitary flash attachment containing a flash lamp and a power supply is attached to and supported upon the top of a camera by support elements including a bayonet-type electrical contact member and a U-shaped support. Electrical contact is provided between the flash attachment and the camera by inserting the bayonet-type electrical contact within a flash bar receptacle on the top of the camera. The U-shaped support member clampingly engages the camera view finder to provide stability and support during camera photoflash operation.

3 Claims, 6 Drawing Figures

U.S. Patent  Aug. 8, 1978  Sheet 2 of 2  4,106,077
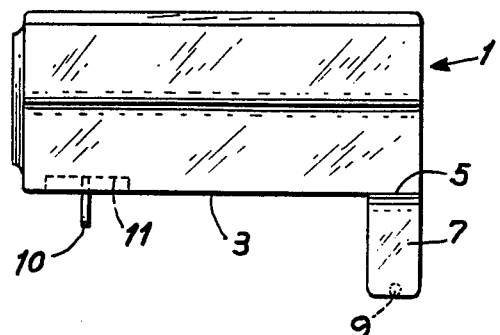
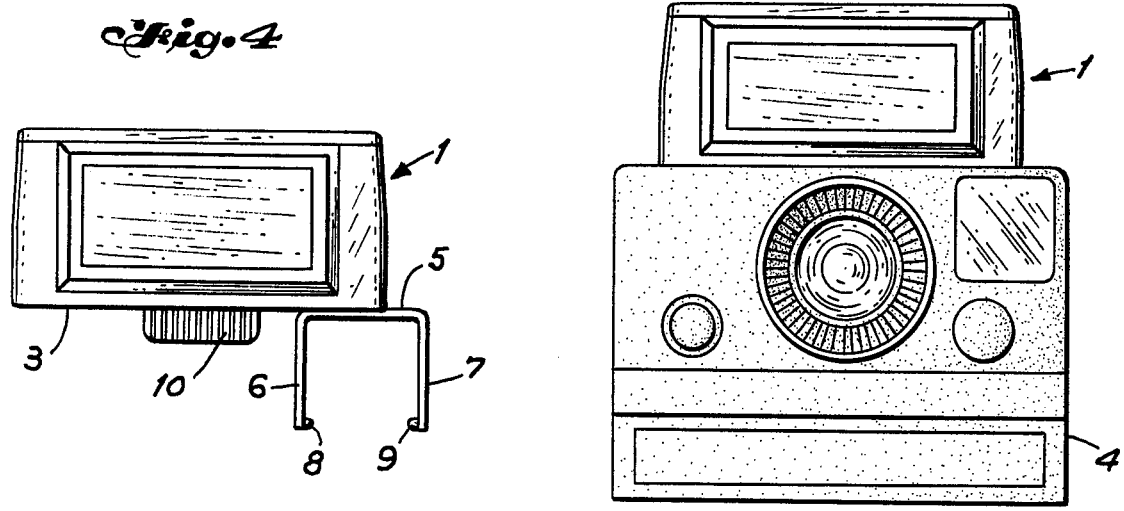
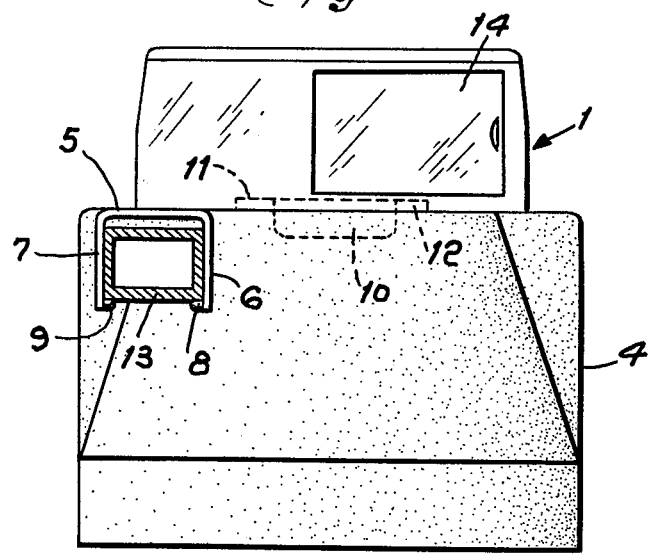

TOP MOUNTED PHOTOFLASH ATTACHMENT FOR CAMERAS WITH SELF-DEVELOPING FILM

This is a continuation, of application Ser. No. 664,772, filed Mar. 8, 1977, now abandoned.

BACKGROUND OF THE INVENTION

Prior photoflash attachments for cameras incorporating self-developing film have typically been two-piece attachments. In one of the two pieces a power pack incorporates the necessary power and electronics to fire a flash lamp, and in the other piece the flash lamp and reflector housing are incorporated. Interconnecting the two pieces is a flexible electrical conductor. Typically the prior art power pack is mounted beneath the camera while the flash lamp is attached above the shutter mechanism of the camera.

One typical example of such a configuration is shown in U.S. Pat. No. 3,943,532. In the prior art, photoflash attachments were designed for Polaroid cameras which operate in either an ambient light or flash mode. These modes were electrically controlled so that the photoflash attachment could remain on the camera and be switched into one or the other modes without being removed from the camera.

In the new "Pronto" type camera there is no electrical switching between the ambient and flash mode but rather the bayonet-type flash bar attachment that typically fits into such cameras mechanically switches the ambient mode into a flash mode. Consequently, for the Pronto camera, it is necessary for the flash lamp attachment to be removed from the camera in order to operate in the ambient mode. Thus it is exceedingly inconvenient if such attachments are made in two separate pieces.

Accordingly, it is an object of this invention to provide a photoflash attachment for a camera incorporating self-developing film which is incorporated into one unitary housing that is mounted on the top of said camera and which is compact and easily removed.

SUMMARY OF THE INVENTION

A photoflash attachment in accordance with the invention includes a flash lamp and a power pack contained within a unitary housing for attachment to the camera. A U-shaped connecting member is integrally formed on the unitary housing and a bayonet-type connection is attached to the housing to make connection with the shutter mechanism of the camera.

BRIEF DESCRIPTION OF THE DRAWINGS

FIG. 3 is a side view of the photoflash attachment embodying the invention;

FIG. 4 is a front view of the flash attachment embodying the invention;

FIG. 5 is a back view of the flash attachment embodying this invention attached to the camera shown in FIG. 1; and FIG. 6 is a front view of the configuration of FIG. 5.

DESCRIPTION OF THE PREFERRED EMBODIMENT

Figure 1:
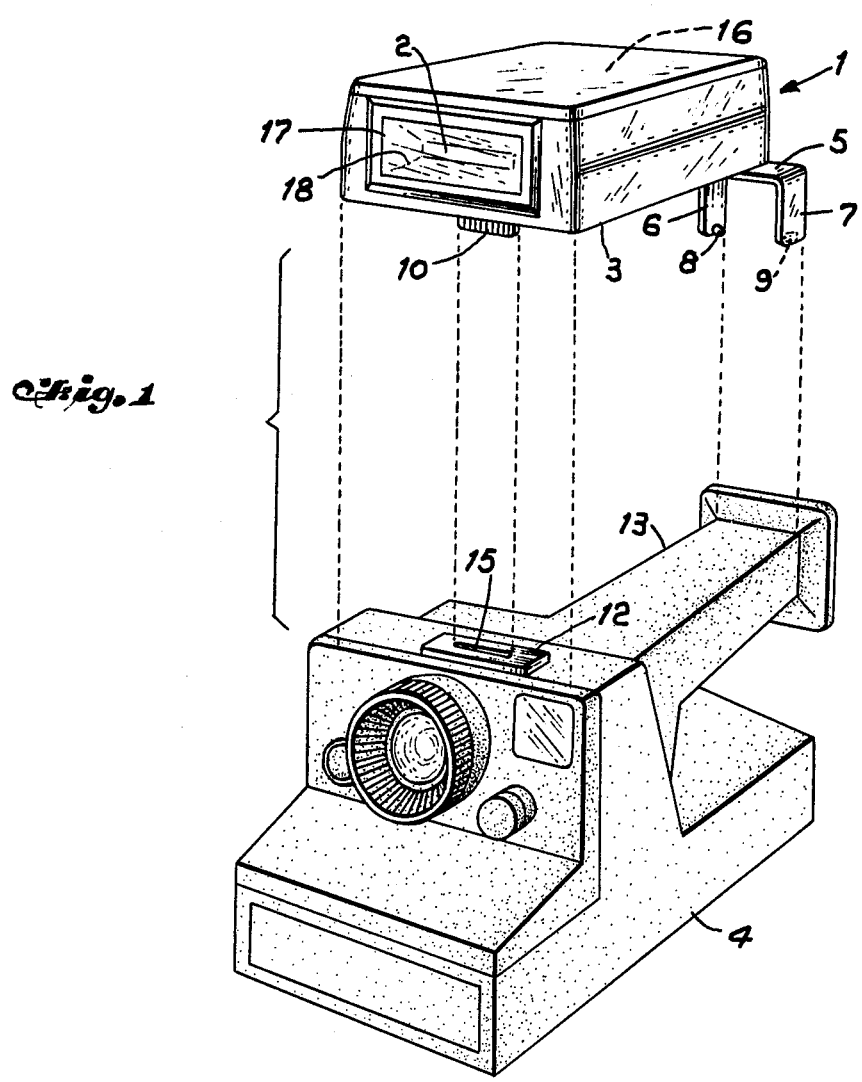
FIG. 1 is an exploded view of a photoflash attachment embodying the invention and a camera for mounting said photoflash attachment.

Referring now to FIG. 1 there is shown a photoflash attachment 1 incorporating a light source 17 comprising a flash lamp 2 and a reflector 18. The attachment 1 also includes a power pack 16 for firing the flash lamp 2 of the light source 17 which is also incorporated in a housing 3. The housing 3 consequently incorporates both the flash lamp 2 and power pack 16 and the means for attaching the flash attachment 1 to the camera 4. The housing 3 also includes a U-shaped support stabilizing member 5 having a pair of bifurcated arms 6 and 7 including a pair of clamping nipples 8 and 9, the purpose of which will be explained below in greater detail. The photoflash attachment 1 includes a bayonet connector 10 for insertion within the flash bar receptacle 15 of the camera 4. The bayonet connector 10 of the photoflash attachment 1 projects from a recess 11 in the photoflash housing 3. The recess 11 (shown in FIG. 2) is formed to mate with the raised flash cube receptacle region 12 on the camera 4. This mating arrangement between the raised receptacle region 12 on the camera 4 and the recessed region 11 in the flash attachment 1 provides added stability between the camera 4 and the flash attachment 1.

Figure 2:
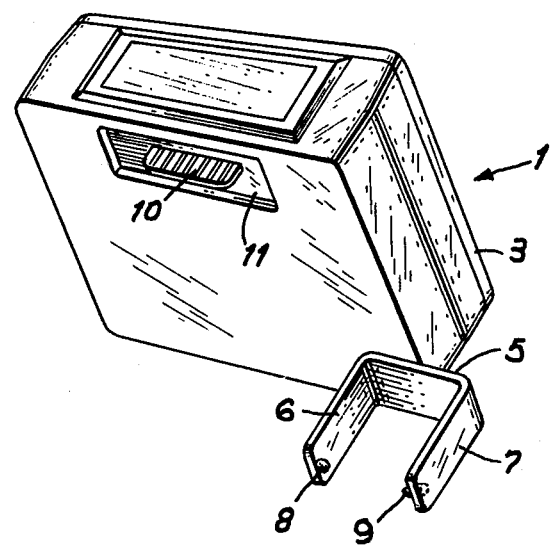
FIG. 2 is a bottom perspective view of the photoflash attachment embodying the invention.

In FIG. 2 shows the recessed area 11 surrounding the bayonet-type connecting member 10 along with the U-shaped support member 5. The support member 5 is mounted offset from the center of the bottom of the flash attachment 1 in order to center the lamp 2 when the flash attachment 1 is attached to the camera 4 by clamping the two projecting arms 6, 7 over the sides of the view finder 13 (as shown in FIG. 1). The combination of the firm attachment between the support member 5 and the view finder 13 along with the firm support provided between the raised region 12 of the camera 4 and the recessed region 11 of the flash attachment 1 as described earlier provides good stability and prevents the flash attachment 1 from moving during operation.

In order to provide further support between the support member 5 and the view finder 13 a pair of projecting nipples 8 and 9 are provided at the ends of the two arms 6, 7 as shown in FIGS. 2 and 4.

FIG. 5 shows the flash attachment 1 connected to the camera 4. The U-shaped support member 5 engages the view finder 13 and the projecting nipples 8 and 9 contact part of the bottom of the view finder 13 to prevent the flash attachment 1 from inadvertently becoming disengaged from the camera 4.

FIG. 3 is a side view of the flash attachment 1 of this invention which shows the relative separation distance between the support clamp 5 and the electrical contact member 10. The separation distance between the support member 5 and projecting electrical contact member 10 is to insure that the flash attachment unit 1 will be supported at more than one point along the top surface of the camera. In order to provide flexibility to the legs 6, 7 of the support clamp 5 the flash unit housing 3 is molded such that the clamp 5 is an integral unitary structure with the flash attachment housing 3. Although other materials may be used to provide the flash attachment housing structure, it is generally preferred to use a plastic having good molding characteristics and good flexibility. Access to the electrical components and batteries for the flash attachment of this invention can be made by means of access odor 14 as shown in the flash attachment embodiment of FIG. 5.

The flash circuit of this invention can be seen in detail by referring to co-pending Application Ser. No. 621,322, filed Oct. 10, 1975, now abandoned, (J. DeFilippis 2-4X) and assigned to the common assignee of the instant invention. The circuit of the instant invention differs from that described in the aforementioned U.S. application in that no electrical switch is required with the instant flash attachment for switching the camera from the ambient mode to the flash operating mode. The camera 4 depicted in FIGS. 1, 5 and 6 is of the type wherein the camera mechanism is switched from ambient mode operation (without a flash lamp) to a flash operative mode by the insertion of the bayonet-type contact member 10 of the flash attachment 1 within the electrical receptacle member 15 of the camera 4. The insertion of the contact member 10 therefore mechanically changes the camera 4 from ambient mode to flash mode operation without requiring the use of any electrical contact switches.

The electrical circuit for use with the flash attachment of this invention further differs from the circuit described in the aforementioned U.S. application in that no delay circuit is required with the flash attachment of this invention.

As described earlier, one example of a prior art flash attachment is U.S. Pat. No. 3,943,532 which contains a power pack assembly attached to the bottom of the camera housing and a flash unit connected to the top of the camera. With this two-part assembly an electrical interconnecting cord is required to provide electrical continuity between the power pack and flash unit assemblies. Since the flash unit and power pack assembly of the instant flash attachment are housed in a single unitary structure no external interconnecting cord is therefore required. Furthermore, the single unitary structure allows the flash attachment of the instant invention to be easily and quickly removed in one operation and readily stored in contrast to the prior art devices. This is necessary because the Pronto camera when operated in the ambient mode must have the bayonet connector removed from the flash bar receptacle.

The compact streamlined relationship provided by the inventive flash attachment unitary design and the structure of the Pronto camera is shown in FIG. 6 where the flash attachment 1 is shown firmly supported upon the camera 4 without auxiliary clamps or electrical cords as required by prior art flash attachment designs.

Although the flash attachment of this invention for use with the new self-developing Pronto type camera, this is by way of example and is not intended as a limitation on the scope of this invention. The flash attachment of this invention finds application wherever top mounted flash attachments may be required.

What is claimed is:

1. An improved photoflash attachment for use with a camera of the type having a flash bar receptacle and a view finder positioned at the top of said camera and offset from the center thereof, said view finder being substantially rectangular in at least a portion thereof and having a predetermined height and a predetermined width in said rectangular portion, said attachment comprising in combination:
   a flash lamp and a power pack mounted in a unitary housing,
   support means for supporting said housing on said camera,
   said support means including a U-shaped support member having a base portion and a pair of resilient support arms extending from said base portion, said pair of support arms being spaced from each other a distance substantially equal to said predetermined width of said view finder,
   said base portion connected to the bottom of said housing so that said support arms extend downwardly from the bottom of said housing and offset from the center of said housing to clamp onto said view finder to support said housing, and
   an electrical contact member protruding from the bottom of said housing and positioned to be inserted into said flash bar receptacle on said camera when said photoflash unit is mounted on the top of said camera.

2. The photoflash attachment of claim 1 wherein said electrical member is located within a recess formed in the bottom of said flash attachment for receiving a corresponding raised portion on the top of said camera containing said flash bar receptacle.

3. The photoflash attachment of claim 2 that further includes a projection on the inner side of each of said support arms and spaced from said base portion a distance substantially equal to the height of said view finder so that said projections clampingly envelope said view finder to provide support for said attachment.

* * * * *